United States Patent
Bengtsson

(10) Patent No.: US 7,387,217 B2
(45) Date of Patent: Jun. 17, 2008

(54) METHOD OF MOLDING PLASTIC PART TO CONTAINER MADE OF FLEXIBLE WEB MATERIAL, A DEVICE THEREFOR, AND CONTAINER HAVING PLASTIC PART MOLDED THERETO

(75) Inventor: Ulf Bengtsson, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 437 days.

(21) Appl. No.: 10/489,409

(22) PCT Filed: Sep. 9, 2002

(86) PCT No.: PCT/JP02/09160

§ 371 (c)(1), (2), (4) Date: Apr. 8, 2004

(87) PCT Pub. No.: WO03/024689

PCT Pub. Date: Mar. 27, 2003

(65) Prior Publication Data
US 2004/0245672 A1    Dec. 9, 2004

(30) Foreign Application Priority Data
Sep. 12, 2001  (JP)  ............................. 2001-275914

(51) Int. Cl.
B65D 6/28    (2006.01)
B65D 61/00   (2006.01)
B65D 7/28    (2006.01)
(52) U.S. Cl. ............................. 220/611; 53/423; 53/487
(58) Field of Classification Search ................ 220/611; 53/423, 487.4; 264/259; 425/126.1
See application file for complete search history.

(56) References Cited

U.S. PATENT DOCUMENTS

| | | | | |
|---|---|---|---|---|
| 4,525,318 A | * | 6/1985 | Reil et al. | 264/259 |
| 4,604,850 A | | 8/1986 | Reil | |
| 4,609,850 A | * | 9/1986 | Hanlet | 315/219 |
| 4,706,874 A | * | 11/1987 | Reil | 222/526 |
| 4,821,490 A | * | 4/1989 | Cassou et al. | 53/423 |
| 5,531,375 A | * | 7/1996 | Palm | 229/137 |
| 2002/0027159 A1 | | 3/2002 | Marbe et al. | |

FOREIGN PATENT DOCUMENTS

EP    0 052 261 A    5/1982

(Continued)

*Primary Examiner*—Anthony D. Stashick
*Assistant Examiner*—Shawn M. Braden
(74) *Attorney, Agent, or Firm*—Buchanan Ingersoll & Rooney PC

(57) ABSTRACT

A plastic part is molded onto a top of a container having folded flaps on the top of the container. The container is formed into a tube shape from a flexible web material with crease lines. Contents are filled into the tube of web material, the tube is transverse sealed and a primary shape container is obtained by cuffing the web material along crease lines. A final shape container is obtained with multi-folding of folded flaps onto the container top. A mold of an injection molding apparatus is applied against the top of the container, and fusion thermoplastic material is injected into the cavity formed between the mold and the top of the container. The thermoplastic material is then cooled, and the mold removed to leave the plastic part molded to the top of the container.

2 Claims, 7 Drawing Sheets

FOREIGN PATENT DOCUMENTS

| | | |
|---|---|---|
| EP | 1 016 592 A | 5/2000 |
| JP | 54-145758 A | 11/1979 |
| JP | 57-115335 A | 7/1982 |
| JP | 60-158003 A | 8/1985 |
| JP | 62-211117 A | 9/1987 |
| JP | 10-194207 A | 7/1998 |
| JP | 11-91000 A | 4/1999 |
| JP | 11-152125 A | 6/1999 |
| JP | 2000-168770 A | 6/2000 |
| JP | 2000-203506 A | 7/2000 |
| JP | 2000-203507 A | 7/2000 |
| JP | 2000-233426 A | 8/2000 |
| WO | WO 98/29308 A | 7/1998 |

* cited by examiner

METHOD OF MOLDING PLASTIC PART TO CONTAINER MADE OF FLEXIBLE WEB MATERIAL, A DEVICE THEREFOR, AND CONTAINER HAVING PLASTIC PART MOLDED THERETO

FIELD

A method is shown for applying a plastic part to a container having flaps of a flexible web material by an injection molding apparatus having molds and nozzles. The mold equipment and a container obtained by the method or the equipment are also shown.

BACKGROUND ART

Plastic parts of an opening device such as a cover, a tap, and a cap can be applied on a container or packaging.

A method of applying plastic parts includes forming a plastic part by extrusion molding or injection molding using various molds (e.g., metal molds) in advance and, applying the plastic part with heat-sealing/adhesive on the packaging container. A method is also known for molding a plastic part directly to an opening top edge, simple container side walls, and a top of a cup-shaped container including, e.g., flexible web materials. However, the use of this method is limited.

A container such as the octagonal-shaped container 1 of FIG. 3 can be obtained by forming a tube from flexible web material, filling the tube with liquid food, transverse sealing of the tube material, cuffing, folding flaps to the container top and, forming the final shape.

In manufacturing a folded container having folded flaps on the container top, a primary container 51 is obtained by cuffing of sealed tube-like material along a crease line, as shown in FIG. 5 (*a*). Final container 1, with an octagonal pillar shape, is obtained by triple foldings, as shown in FIG. 5 (*b*), to container top 53 of folding flaps 52, as shown in FIG. 5(*c*).

For example, in the container as shown in FIG. 7, the folded flaps 52 are folded on the container top wall 53. There are gaps between the folded flaps and the container top wall, gaps between the folded flaps and the other folded flaps, steps between the container top walls, and steps between the folded flaps. The container does not have a simple design. When the plastic parts of a cover, etc., are applied to the container top wall, the design of the plastic parts and the container may be limited.

In a container having folded flaps, the flaps are folded by using flexible web materials with crease lines, and folding along the crease lines. Further manufacturing processes, energy, material, and equipment are necessary when using adhesive or heat sealing to fix the folded flaps to the container top wall.

In a container having the flaps folded on the container top wall, dust, garbage, and small insects can stick in the gaps and steps referred to above when the container is being delivered.

SUMMARY

In various exemplary embodiments, a method is provided for applying a plastic part to a container, an apparatus for applying the plastic part is provided, and a container formed using the method and the apparatus is provided. According to the exemplary embodiments, simple designs are provided for the container or the plastic parts to be applied to the container having folded flaps on the container top wall and having gaps and steps on the container top wall.

According to exemplary embodiments, a method of applying a plastic part, the apparatus used in the method and a container resulting from the method are provided, in which, for fixing folded flaps onto the container top wall, the further manufacturing steps, equipment, energy and material for applying adhesive or heat-sealing are not needed in the container having folded flaps on the container top wall and having gaps and steps on the container top wall.

Exemplary embodiments provide a method of applying a plastic part, the apparatus for applying the plastic part and the resulting container, in which the gaps and steps of the container top can be deleted and the containers will not be contaminated by dust, garbage, small insects, etc. that can become trapped in gaps or steps on the container top wall during delivery.

A molding method according to an exemplary embodiment molds a plastic part onto a top of a container obtained by forming a flexible web material with crease lines into a tube shape, filling contents into the tube, transverse-sealing and cuffing the tube web material, folding a primary shape container obtained by the cuffing along crease lines, and forming a final shaped container with multi-folding of the folded flap onto the container top.

The method includes forming a cavity between an inner wall of a mold and the top of a container by applying a mold of an injection molding apparatus having a nozzle to the container top, injecting fusion thermoplastic material from the nozzle into the cavity, against the inner wall face of the mold and into gaps between the folded flaps and the top face of the container, cooling the injected thermoplastic material immediately, and leaving the plastic part formed to the top of the container by detaching the mold of the injection molding apparatus from the container top.

In an exemplary embodiment, the final shape of the container formed using a molding method according to an exemplary embodiment is substantially octagonal prism pillar shaped.

In an exemplary embodiment of the mold method, the container top is upturned and the mold of the injection molding equipment is applied on the container top.

In another exemplary embodiment of the mold method, the container top is down-turned and the mold of the injection molding equipment is applied against the container top.

The cavity between the mold and the container top is sealed by pressure from the side walls of the contents-filled container during the application of the mold of the injection molding apparatus against the container top.

In one exemplary embodiment of the method, the mold consists of a single member.

In another exemplary embodiment of the method, the mold consists of plural members.

A mold apparatus for applying a plastic part to a container made from flexible web materials includes a transporting means for transporting a container to a position where the container top is brought into contact with an injection mold. The container is formed from flexible web material with crease lines into a tube shape, the contents are filled into the tube, the tube is transverse-sealed and the tube web material is cuffed. A primary shape container is obtained by the cuffing along the crease lines. A final shape container is obtained by multi-folding of folded flaps onto the container top.

The mold apparatus includes a nozzle for injecting fusion thermoplastic material. The mold forms a cavity by applying the mold to the container top, and a passage connects the nozzle outlet with the cavity interior.

A cooling means is provided to cool the thermoplastic material injected into the cavity of the mold. A drive means moves the nozzle and the mold to bring the mold against the container top, and to detach the mold from the container top.

In an exemplary embodiment of the mold apparatus, an inner wall face of the mold is downwardly arranged, and the container is transported in an upward direction to bring the top of the container into contact with the mold.

In another exemplary embodiment of the mold apparatus, an inner wall face of the mold is upwardly arranged and the container is transported in a downward direction to bring the top of the container into contact with the mold.

DETAILED DESCRIPTION

A container having a molded plastic part according to an exemplary embodiment is formed from a flexible web material with crease lines into a tube shape. Contents are filled into the tube, the tube is transverse-sealed, and the tube web material is cuffed. A primary shape container is obtained by the cuffing along crease lines. A final shape container is formed by multi-folding folded flaps onto the container top.

A container cover of thermoplastic material is formed on the top of the container by injection of fusion thermoplastic material that fills the gaps formed by the folded flaps on the top face of the container.

The thermoplastic material is injected from a nozzle of an injection molding apparatus, and the shape of the container cover formed from the thermoplastic material is determined by the inner wall of the mold of the injection molding apparatus.

Figure 4:
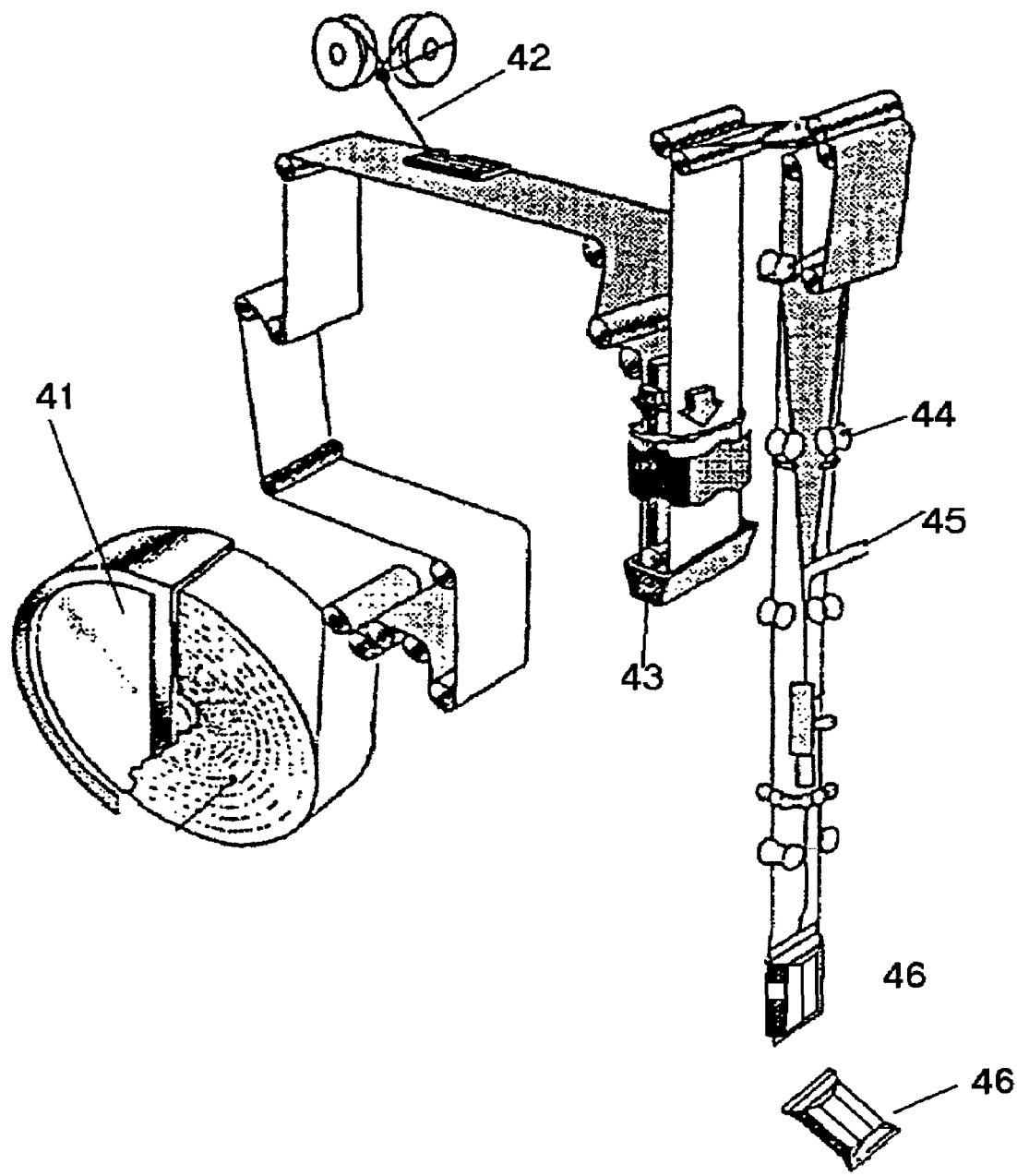
FIG. 4 is a perspective schematic view of equipment for making a container with folded flaps used in an exemplary embodiment.
Figure 5:
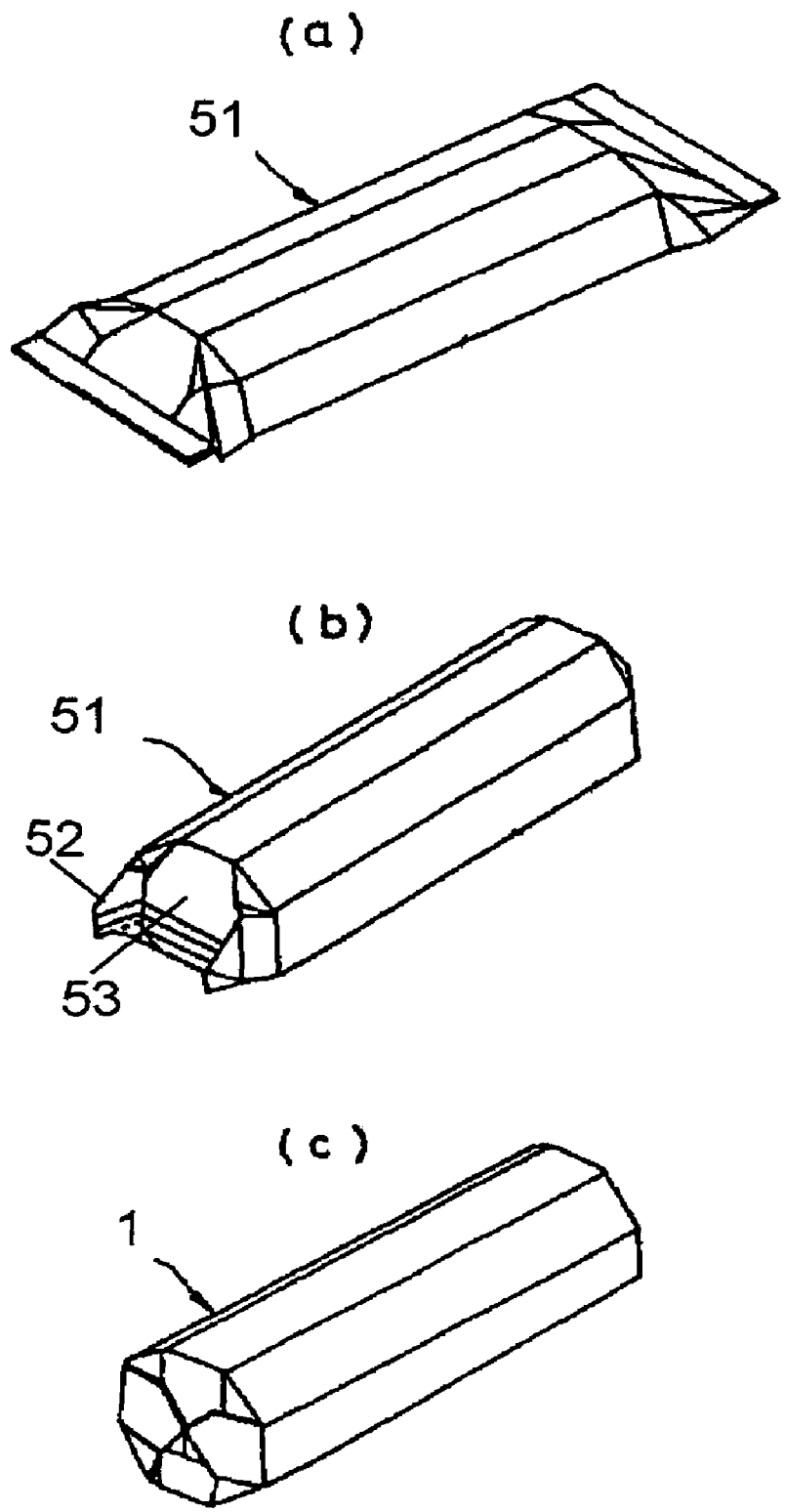
FIGS. 5(a)-5(c) illustrate perspective views of an octagonal pillar container with folded flaps.

A schematic illustration of an apparatus used to form a container from flexible web materials is shown in FIG. 4. The resulting container will receive a plastic part according to an exemplary embodiment.

A web of flexible packaging material having a thermoplastic material layer as an innermost layer, and having crease lines on the surface, is processed by the apparatus shown in FIG. 4. The flexible packaging material is transported from a roll of flexible packaging material 41 by rollers. Strip tape 42 is joined to one end of the packaging material web with a strip tape applicator. The packaging material web then passes through a sterilization agent tank 43 and is sterilized. The sterilization agent is removed with an air knife.

The packaging material web is formed into a tube by forming roller 44. The tube is longitudinally sealed by a longitudinal seal element. Liquid food is filled into the resulting tube from a filling pipe 45. While moving the tube down by a length equivalent to one container, the tube is sandwiched by a seal jaw of a transverse heat seal apparatus and a facing jaw such that the tube is transverse-sealed in the transverse direction. A primary pillow-shaped container 46 is formed continually by this process. A transverse sealing zone of the container is cut, and the individual packaging container 46 is separated with knives.

The flaps of the top and bottom of the separated pillow-shaped container 46 are folded along the crease lines. A final shaped container is formed by folding the folded flaps to the container top.

The layer structure of examples of the flexible web material that can be used in the containers according to an exemplary embodiment includes a thermoplastic material layer as an outermost layer, a paper layer, a metal layer of an oxygen barrier layer and a thermoplastic material layer as an innermost layer.

Packaging material used in a container according to an exemplary embodiment is not limited to the above example. Alternative packaging materials can be used. For example, the packaging laminate can include one or more layers of a low-density polyethylene (LDPE), a printing ink layer, a fibrous substrate layer, aluminum foil, a paper substrate layer, and a layer of polyester (PET), in various combinations.

In addition, ethylene-alpha-olefin copolymer (so-called metallocene PE) polymerized by using a single site catalyst, can be used for an innermost layer and/or an outermost layer, as well as the above LDPE. Furthermore, as a practical substitute for a metal layer (aluminum foil) of the oxygen barrier layer, a vapor deposit layer of inorganic oxide can be used. Furthermore, in addition to the above paper or fibrous substrate layer, a plastic substrate kneaded with powder or granular in organics and plastic material can be used.

Figure 1:
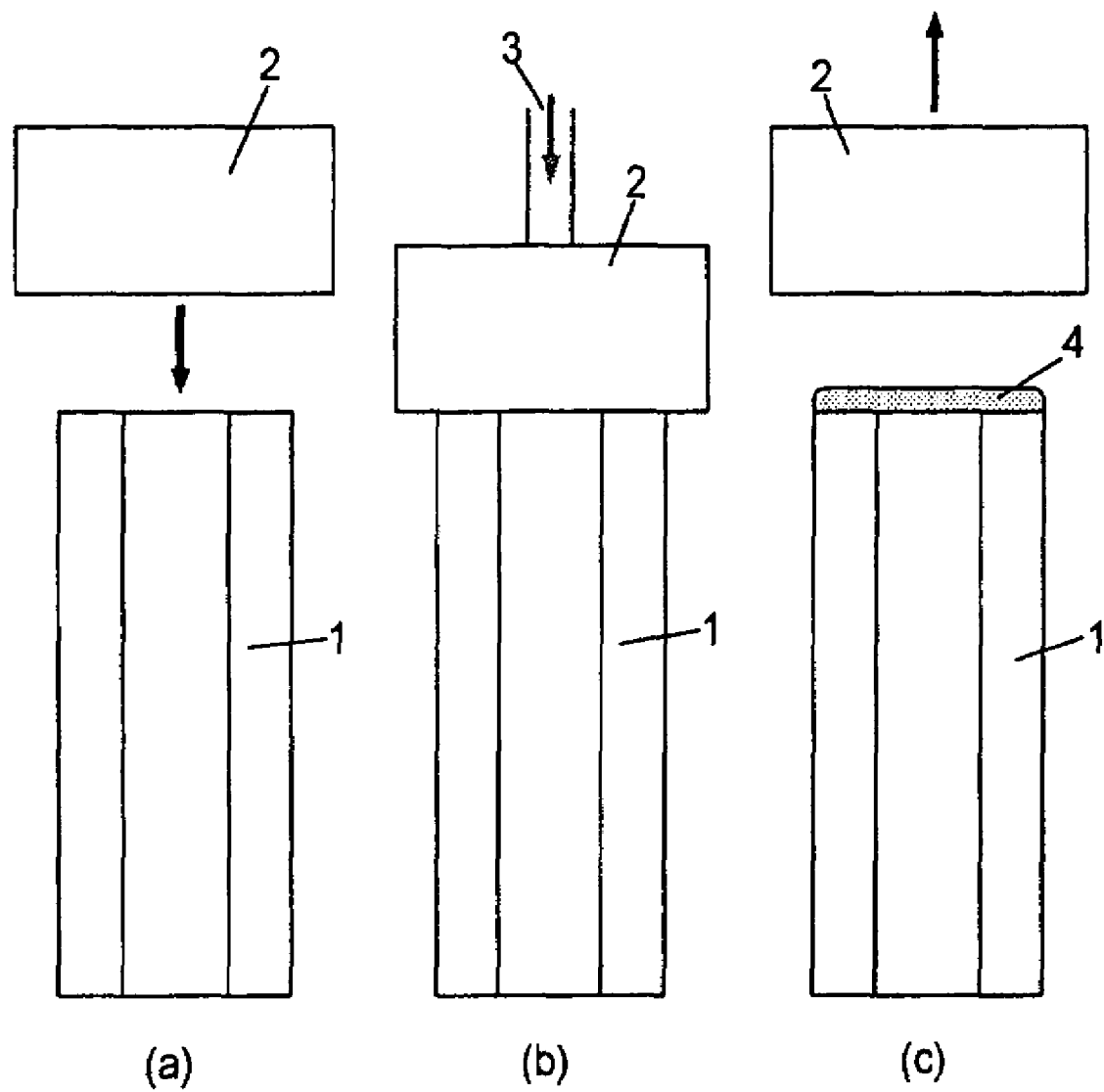
FIGS. 1(a)-1(c) illustrate a molding method according to an exemplary embodiment.

A mold method according to an exemplary embodiment is shown in FIG. 1. The container 1 is prepared by forming a flexible web material with crease lines into a tube shape, filling contents into the tube of web material, transverse sealing and cuffing the tube of web material along crease lines to form a primary shape container, and forming a final shape container by multi-folding flaps onto the container top.

After forming the final shape container, a plastic part 4 is molded to the top of the container.

A method according to one exemplary embodiment includes the following steps:

(1) Applying a mold 2 of an injection molding apparatus having a nozzle 3 onto the container top, thereby forming a cavity between an inner wall of the mold and the top of the container.

(2) Injecting a fusion thermoplastic material against the inner wall face of the mold and into the gaps between the folded flaps and the top face of the container by injection of the fusion thermoplastic material from the nozzle into the cavity.

(3) Cooling the injected thermoplastic material immediately.

(4) Detaching the mold of the injection molding apparatus from the container top to leave the plastic part molded to the top of the container.

Figure 6:
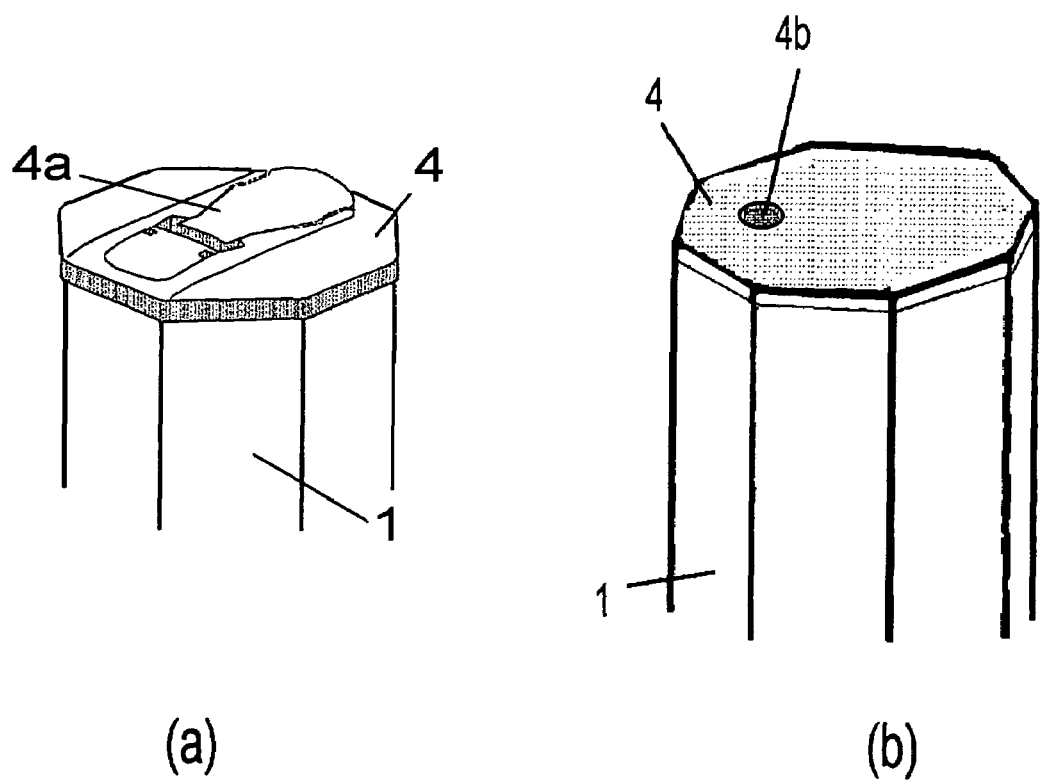
FIGS. 6(a) and 6(b) illustrate partial perspective views of a packaging container according to an exemplary embodiment.

An example of a plastic part 4 molded onto the top of container 1 is shown in FIG. 6. The shape of the final container is substantially a octagonal prism pillar shape.

In the example shown in FIG. 6 (*a*), an opening device 4*a* of the container covering the entire top of the container 1 is applied on the container. The opening device 4*a* includes a portion that can be raised manually, a portion that can be opened using a lever principle, and a portion supporting the other portions and covering the top of the container.

In the exemplary embodiment shown in FIG. 6 (*b*), a cap 4 of the container 1 covering the entire top of the container 1 has been applied to the container. In the cover 4, a hole 4*b* for a straw is formed. The hole is formed so that the remaining thickness of melted thermoplastic material is thin, and a straw can be inserted in the hole during use.

Figure 2:
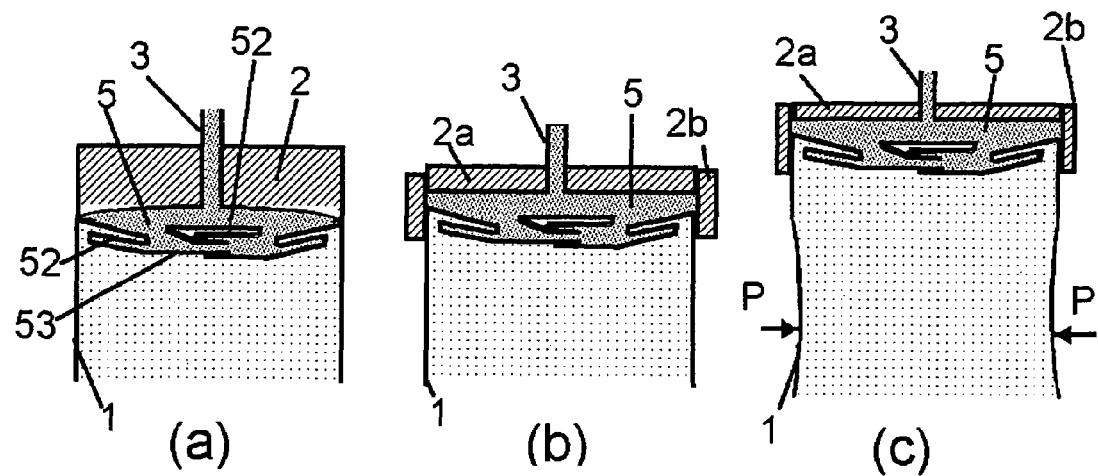
FIGS. 2(a)-2(c) illustrate sectional views of a container being processed according to an exemplary embodiment.
Figure 3:
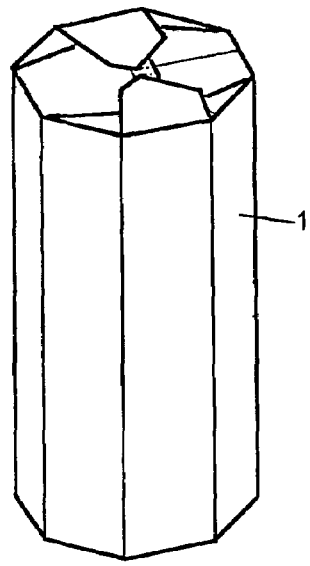
FIG. 3 is a perspective view of an octagonal pillar container with folded flaps.
Figure 7:
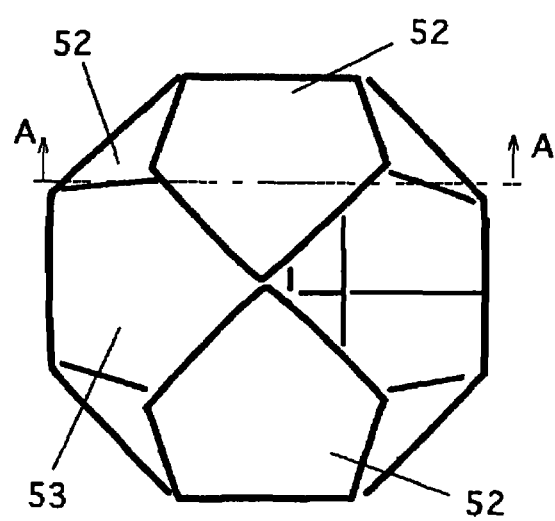
FIG. 7 is a plan view showing a top of an octagonal pillar container with folded flaps used in an exemplary embodiment.

In the embodiment shown in FIG. 1, the side of the container top turns upward, and the mold of the injection molding apparatus is applied to the container top. FIG. 2 shows a section taken along line A-A of FIG. 7, and illustrating the folded flaps 52 and the top wall 53 of the container 1.

As shown in FIG. 2 (*a*), a cavity 5 is formed between the inner wall of the mold 2 and the top of container 1 by applying the mold 2 of an injection molding apparatus having a nozzle 3 to the top of container 1.

A fusion thermoplastic material is injected from the nozzle 3 into cavity 5, against the inner wall surface of the mold and into the gaps between the folded flaps and the top surface of the container. The injected thermoplastic material is cooled immediately. The resulting plastic part remains formed to the top of the container when the mold 2 of the injection molding apparatus is detached from the top of the container 1.

The mold can include plural members 2*a*, 2*b*, as shown in FIG. 2(*b*), or a single member 2, as shown in FIG. 2(*a*). The side mold members 2*b* in the exemplary embodiments of FIGS. 2(*b*) and 2(*c*) assist in an accurate and secure application of the mold to the top wall of the container during the molding operation.

The cavity 5 between the mold and the top of the container is sealed by pressure (P) on the side walls of the contents-filled container 1 when the mold 2 is applied to the container top. The pressure P on the side walls of the container causes the top of the container to expand outward against the mold members 2*b*, thereby ensuring a secure fit between the container top wall and the mold.

Figure 8:
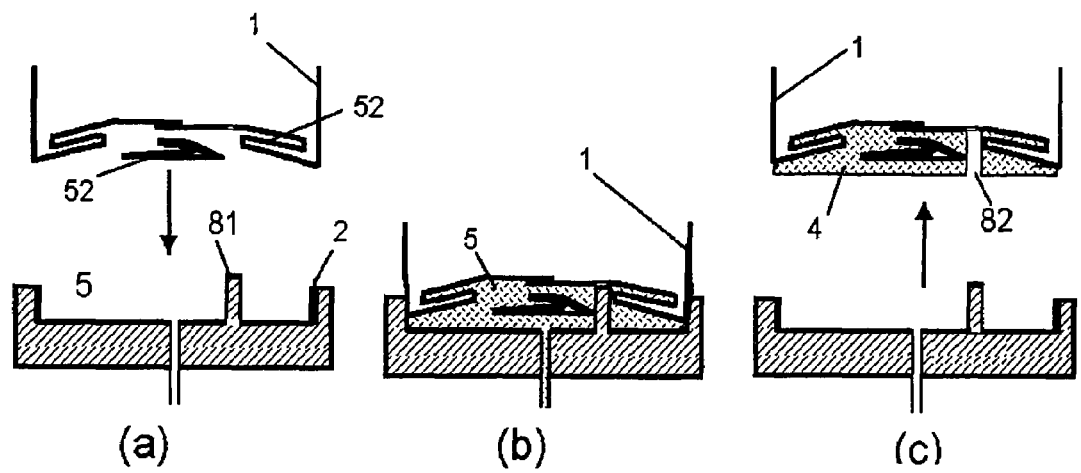
FIGS. 8(a)-8(c) are sectional views showing details of a method according to an exemplary embodiment.

Another exemplary embodiment of a method for applying the mold 2 of an injection molding apparatus to the container top, with the flaps of the container being folded against the top of the container 1, is shown in FIGS. 8(*a*)-8(*c*).

As shown in FIG. 8(*a*), the upward-directed inner walls of the mold 2 of the injection molding apparatus receive the container top. The container top having the folded flaps 52 is applied into the cavity 5 formed by the inner walls of the mold and the top of the container.

A supporting member 81 in mold 2 can assist in holding down the folded flaps temporarily as the container 1 is lowered into the mold of the injection molding apparatus. The supporting member 81 can hold down the folded flaps 52 temporarily during injection and/or after injection of the fusion thermoplastic material, thereby controlling the amount that the flaps protrude from the container top. The supporting member 81 can also be used to form a straw-inserting hole 82 through the plastic part 4 by acting as a core for the hole 82 during the molding operation.

The fusion thermoplastic material is injected from the nozzle of the injection molding apparatus into the cavity 5 formed between the inner wall face of the mold, the gaps between the folded flaps and the top face of the container, as shown in FIG. 8(*b*).

The resulting plastic part 4 is formed to the top of the container after the injected thermoplastic material is immediately cooled and the mold 2 of the injection molding apparatus is detached from the container top, as shown in FIG. 8(*c*). This arrangement can prevent or minimize the leaking of the fusion thermoplastic material from the cavity 5.

Figure 9:
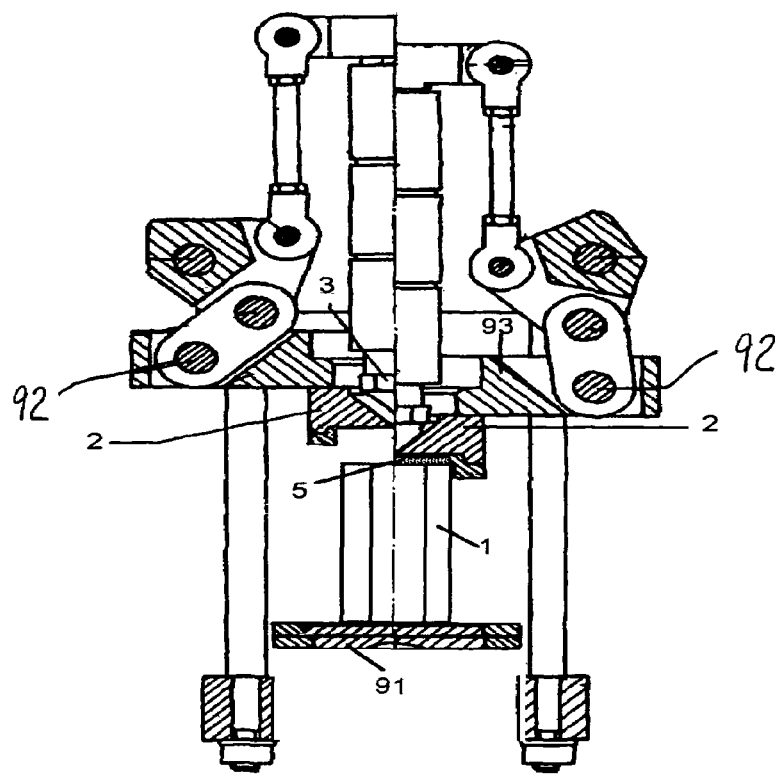
FIG. 9 illustrates a mold apparatus according to an exemplary embodiment.

Referring to FIG. 9, an exemplary embodiment of an apparatus for molding a plastic part to a container made from flexible web materials is shown. The left half of FIG. 9 shows the condition when the mold 2 of the injection molding apparatus is raised away from the top of a container. The right half of FIG. 9 shows the condition when the mold 2 of the injection molding apparatus has been lowered against the container top, and a cavity 5 is formed between the mold and the container top.

The apparatus includes a transportation means or movable platform 91 that can transport the octagonal pillar shape container 1 having folded flaps on the top of the container into a mold position. A nozzle 3 is provided for injecting fusion thermoplastic material into the cavity 5 formed between the mold 2 and the container top. A passage can be formed in the mold for connecting the nozzle outlet with the cavity interior. A cooling means can also be provided for cooling the thermoplastic material injected into the cavity of the mold. A drive means 92 can move the nozzle and the mold into position against the container top.

The mold 2 can be moved vertically between the two positions shown on the left and right sides of FIG. 9, and a mold support 93 can be fixed to mold 2 through a toggle joint. The mold support 93 can be driven by a hydraulic pressure type apparatus.

The container obtained using the above method and apparatus is a container having a molded plastic part applied to the top of the container, with the container being an octagonal pillar shape container 1 having folded flaps on the container top.

Figure 10:
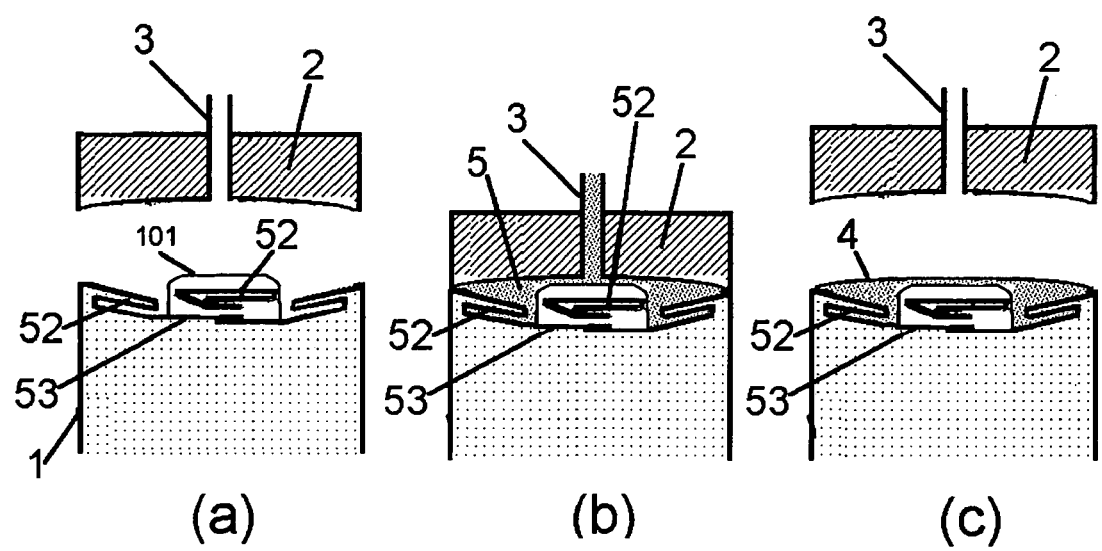
FIGS. 10(a)-10(c) are sectional views showing details of a method according to an exemplary embodiment.

Referring to FIG. 10, exemplary embodiments of a method and apparatus for molding a plastic part to a container made from flexible web materials is shown. In the exemplary embodiment of FIG. 10, a support spacer member 101 is arranged against the container top 53 before forming a cavity between the inner wall of a mold and the container top by applying the mold of an injection molding apparatus having a nozzle to the container top. The support spacer member 101 can be a compact, hollow foam body applied to the container wall of the container top. In the illustrated exemplary embodiment, the support spacer member is applied to the top of the container in advance. The support spacer member allows for a reduction of the space in the cavity, and a reduction in the consumption of injection material. Furthermore, the mechanical strength of the plastic part can be reinforced.

As shown in FIG. 10(*a*) of the exemplary embodiment, the inner wall of the mold 2 of the injection molding apparatus having the nozzle 3 is directed downward. The container top 53 having folded flaps 52 is applied against the mold, and the cavity 5 is formed between the inner wall of the mold and the top of the container. The support spacer member 101 is applied to the container top 53 in advance, as shown in FIG. 10 (*a*).

The fusion thermoplastic material is injected from the nozzle into the cavity 5, against the inner wall face of the mold and into the gaps between the folded flaps and the top face of the container, as shown in FIG. 10(*b*).

The injected thermoplastic material is cooled, and the mold 2 is detached from the container top, leaving the plastic part 4 molded to the top of the container, as shown in FIG. 10(*c*).

In the various exemplary embodiments, the material of the outer layer of the flexible web material making up the container can be chosen to be compatible material having good adhesive properties with the injection-molded thermoplastic material.

The container having a molded plastic part according to exemplary embodiments can be used to pack milk, juice, refined sake, shochu, mineral water, liquid food or other drinks.

The invention claimed is:

1. A method of molding a plastic part onto a top of a container, the container formed from a flexible web material with crease lines into a tube shape, filled with contents, transverse-sealed and cuffed to form a primary shape container and formed into a final shape container by multi-folding of folded flaps onto the container top, the method comprising:

forming a cavity between an inner wall of a mold of an injection molding apparatus having a nozzle and the top of the container by applying the mold of the injection molding apparatus to the container top;

injecting fusion thermoplastic material into the cavity, against the inner wall of the mold and into gaps between the folded flaps and the container top by injection of the fusion thermoplastic material from the nozzle into the cavity;

cooling the injected thermoplastic material;

detaching the mold of the injection molding apparatus from the container top to leave the molded plastic part joined to the container top; and wherein a support member is temporarily arranged in the mold of the injection molding apparatus to hold the flaps.

2. A method of molding a plastic part onto a top of a container, the container formed from a flexible web material with crease lines into a tube shape, filled with contents, transverse-sealed and cuffed to form a primary shape container and formed into a final shape container by multi-folding of folded flaps onto the container top, the method comprising:

forming a cavity between an inner wall of a mold of an injection molding apparatus having a nozzle and the top of the container by applying the mold of the injection molding apparatus to the container top;

injecting fusion thermoplastic material into the cavity, against the inner wall of the mold and into gaps between the folded flaps and the container top by injection of the fusion thermoplastic material from the nozzle into the cavity;

cooling the injected thermoplastic material;

detaching the mold of the injection molding apparatus from the container top to leave the molded plastic part joined to the container top; and wherein a support spacer member is arranged on the container top before forming the cavity between the inner wall of the mold and the container top by applying the mold to the container top.

* * * * *